United States Patent [19]
Cindrich et al.

[11] 3,856,409
[45] Dec. 24, 1974

[54] LASER ALIGNMENT DEVICE

[75] Inventors: Ivan Cindrich, Southfield; Carl C. Aleksoff; Alex Klooster, Jr., both of Ann Arbor, all of Mich.

[73] Assignee: KCA Laser Systems, Ann Arbor, Mich.

[22] Filed: May 9, 1973

[21] Appl. No.: 358,765

[52] U.S. Cl................. 356/138, 356/250, 350/285, 331/94.5 A, 33/291
[51] Int. Cl. ............................................. G01b 11/26
[58] Field of Search ....... 356/138, 250; 331/94.5 A; 33/1 DD, 1 N, 282, 283, 286, 290, 291; 350/16, 285

[56] References Cited
UNITED STATES PATENTS

| | | | |
|---|---|---|---|
| 2,959,088 | 11/1960 | Rantsch | 33/290 X |
| 3,628,874 | 12/1971 | Tagnon | 356/250 X |
| 3,684,381 | 8/1972 | Zoot | 356/138 |
| 3,729,266 | 4/1973 | Mason et al. | 356/250 |
| 3,748,041 | 7/1973 | Bird | 33/286 X |

*Primary Examiner*—Ronald L. Wibert
*Assistant Examiner*—Paul K. Godwin
*Attorney, Agent, or Firm*—Fisher, Krass, Young & Gerhardt

[57] ABSTRACT

A projector of a high intensity collimated light beam for alignment use and employs a laser as a light source. A diverging lens expands the fine laser beam and passes it to a damped, pendulously supported, inclined mirror where it is reflected to a double convex condensing lens which acts to condense the beam. A plano-concave lens having its concave surface adjacent to the exit convex surface of the condensing lens is adjustably supported for movement about the center of curvature of the concave surface so as to tilt the planar surface relative to the axis of the entering beam and thus adjust the exit angle of the beam. The adjustment mechanism includes a pair of pivoting arms which contact one another at their free ends and a micrometer adjustment knob for pivoting the arms and providing a digital readout of their inclination which is equal to the beam elevation grade by virtue of the geometry of the mechanism. Once the angle is adjusted the pendulously supported mirror maintains the exit angle of the beam against the small tilts of the housing.

16 Claims, 3 Drawing Figures

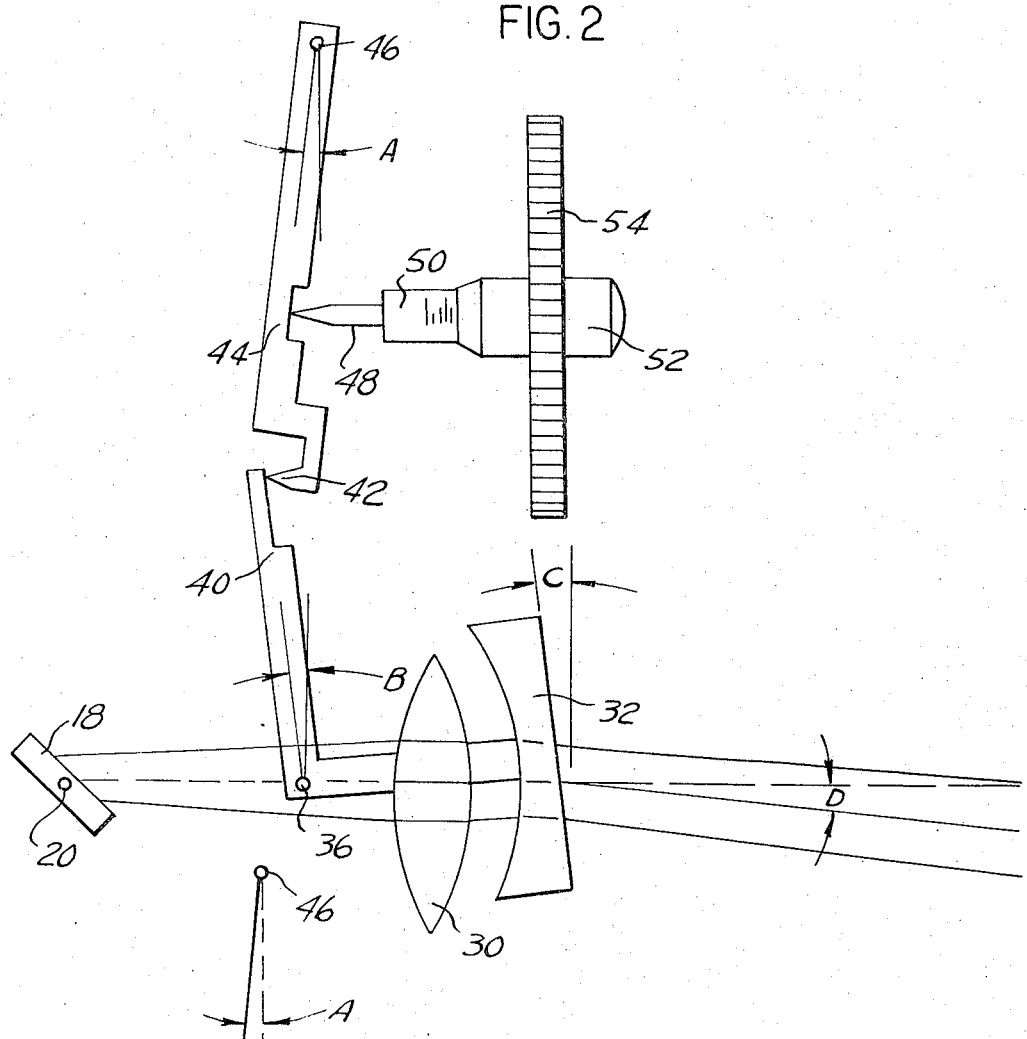
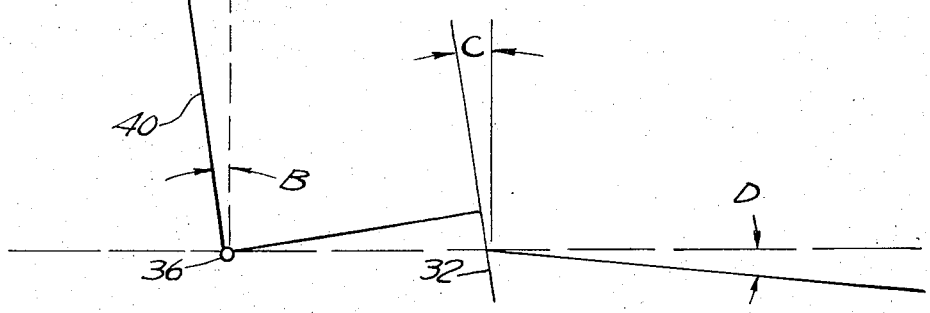

LASER ALIGNMENT DEVICE

FIELD OF THE INVENTION

This invention relates to a source of a collimated light beam for alignment purposes including means for adjusting the exit grade of the beam from the source and gravity sensitive mechanism for maintaining that grade despite tilting of the source housing.

BACKGROUND OF THE INVENTION

1. Prior Art

The use of thin, collimated, high intensity light beams as reference lines, in surveying and the construction industry, has increased substantially over the past several years. In activities such as pipe laying and bridge erection the traditional alignment techniques employing strings or visual observations of a reference point by telescope have been largely supplanted with methods involving the generation of a light beam along the desired alignment axis and the use of targets at any point along the beam to align structural elements with the light axis. The light beam method has proven quicker and simpler to use and more accurate than the previous techniques.

Development of the laser as a source of beamed high intensity light has reduced the size and the power requirements of alignment light sources. Lasers are presently available which are compact, highly reliable in operation and low in cost. These may be housed in compact packages and are quite portable and easily erected in the field.

The first step in the use of light beam as an alignment tool is the adjustment of the housing so the beam projects in the proper direction and at the proper grade. In prior art devices this positioning is typically accomplished by manipulation of the beam housing through adjustment of the mount for the light source. The accuracy of this adjustment is one limiting factor in the accuracy of the entire alignment process.

The other major factor affecting the accuracy of light alignment techniques is the stability of the light source during use. In the field it is often difficult to provide a firm, steady support for the light beam and the beam must be regularly checked to insure that no shift in the source has occurred. To simplify both the problem of aligning the beam to the horizontal orientation, which is required in certain alignment processes and to stabilize the beam against tilting of the light housing, certain prior art light sources have included gravity sensitive elements which maintain the beam in a true horizontal attitude independently of motion of the housing. These devices are not suitable for use in those alignment situations wherein the reference line must assume an inclination with respect to the horizontal, as is often the case in construction of pipelines and bridges.

SUMMARY OF THE PRESENT INVENTION

The present invention contemplates a source of a collimated high intensity light beam for alignment purposes including means for simply manually adjusting the exit grade of the beam from the source housing relative to the horizontal. The source includes a horizontal reference which also acts to stabilize the beam against motion of the housing about a horizontal axis perpendicular to the axis of the beam. The adjustment of the beam grade in light sources formed in accordance with the present invention is simple and highly accurate, and a preferred embodiment of the invention incorporates a digital display system which allows the direct readout of the exit grade of the beam relative to the horizontal. The grade of the beam may thus be adjusted without use of any external instruments. The automatic tilt compensation mechanism obviates the need for frequent checks of the beam angle.

In a preferred embodiment of the invention the beam from the laser is first passed through a diverging lens so that the overly fine laser beam may be expanded to a cross-section which is convenient for alignment purposes and collimated with a high degree of accuracy. The laser is preferably aligned vertically and the divergent beam from the lens is bent into the horizontal by reflection from a pendulously supported mirror having a suitable damping mechanism. The pendulum adjusts the angle of the mirror so that the beam exit direction is stabilized despite tilting of the housing in the direction in which the mirror stabilization acts. The beam reflected from the mirror is then collimated by a double convex condensing lens acting together with a plano-concave lens which has its concave surface adjacent to the convex exit surface of the condensing lens. This output lens is adjustable along a path wherein its planar surface assumes various inclinations relative to the central axis of the condensing lens and of the laser but the curvature of the concave surface remains invariant relative to the beam entering the concave surface. The plano-concave lens thus acts as a prism to maintain the beam in collimated form but bend it relative to the central axis of the beam entering the double convex lens. A combined action is thus obtained wherein the pendulously mounted mirror acts to maintain the beam direction stabilized, independent of small motions of the housing and the prism action serves to adjust the grade of the exit beam relative to the central axis of the beam.

The adjustment mechanism for the plano-concave lens includes an L-shaped arm which is pivotably supported at its bend which also represents the center of the curvature of the concave entrance side of the plano-concave lens. The plano-concave lens is fixed to one end of this arm so that it is effectively movable about its center of curvature. The other end of this first pivoting arm projects generally normally to the laser beam, or parallel to the laser itself. Its far end is contacted by the free end of a second pivoting arm which also extends generally parallel to the axis of the laser. The angular position of the second arm controls the support position of the plano-concave lens and the angle of the output beam. The angular position of the second arm is controlled by a micrometer mechanism which extends normally to a line between the pivot points of the first and second lever arms and bears against the second arm. The screw for the micrometer is connected through gearing to a digital readout device which exhibits a number representing the micrometer position. The lengths of the first and second lever arms and the index of refraction of the plano-concave lens are chosen in accordance with Snell's law so that the angle of adjustment of the exit beam relative to the beam entering the double convex lens is equal to the angle of the second arm relative to the line between the pivot points of the two adjustment arms. A given movement of the micrometer produces a like change in grade of the beam. Thus the digital readout provides a direct indication of the exit grade of the light beam from the plano-concave lens, relative to the central axis of the beam entering the double convex lens, and no correction factors or nonlinear mechanisms must be introduced into the readout.

The preferred embodiment of the invention thus takes the form of a relatively simple compact package, primarily oriented in the vertical direction, which allows a simple adjustment of the output beam relative to the central axis of the stabilized beam entering the double convex lens and an automatic maintenance of that angle independent of small tilts of the housing in the direction of the stabilizing action.

Other objectives, advantages and applications of the invention will be made apparent in the detailed description of a preferred embodiment wherein:

FIG. 2 is a schematic diagram of those components of the source which provide adjustment of the beam grade; and FIG. 3 is a diagram illustrating the geometric relationship of the components in the grade adjustment mechanism.

Figure 1:
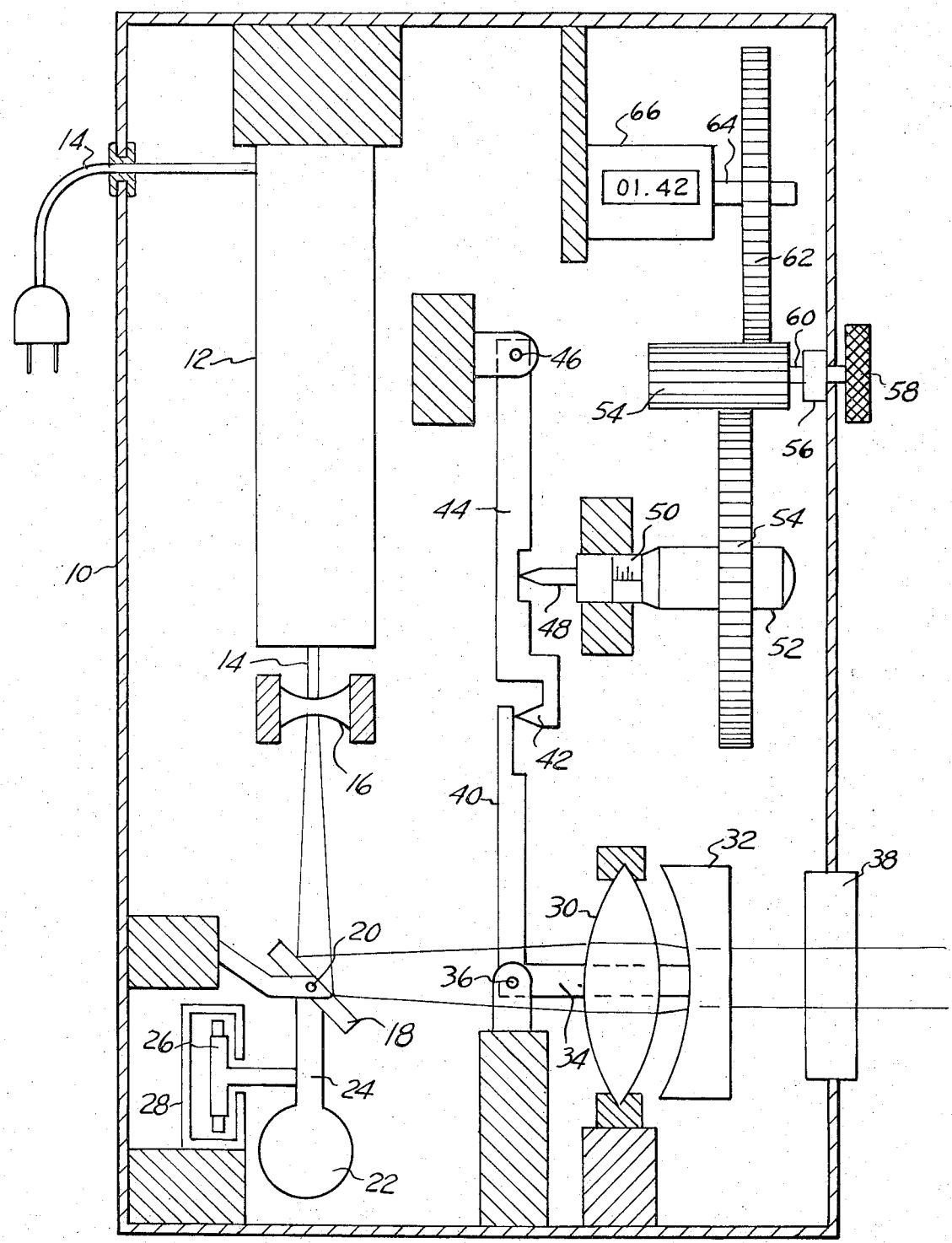
FIG. 1 is a front view of a collimated light beam source formed in accordance with the present invention.

Referring to the drawings a preferred embodiment of the invention is housed in a case 10 illustrated with its side open, disposed in the normal attitude in which it would be used in the field.

The light beam produced by the unit is derived from a laser 12 which may be a low cost helium-neon laser powered from a suitable supply via an electric cord 14. Other forms of lasers and other high intensity light sources such as mercury-vapor lamps might be utilized in other embodiments of the invention. The laser beam is schematically illustrated at 14 and as it leaves the laser it is too narrow in cross-section and too divergent to be useful in connection with alignment purposes over relatively long distances.

To expand and collimate the beam it is first passed through a double concave lens 16 which causes the beam to diverge. The spreading beam is directed to an inclined mirror 18 pivotably supported in a suitable mounting mechanism about an axis 20 which passes through its center. A weight 22 connected to the mirror 18 by an arm 24 maintains the mirror surface at such an orientation angle as to cause the reflected beam position to be stabilized independent of any rotation of the housing 10 about the axis of the pivotable support 20. The motion of the mirror as a result of small changes in position of the housing 10 is damped by a piston 26 connected to the arm 24 and movable within a cylinder 28. The piston and cylinder arrangement acts to prevent any oscillation of the mirror as a result of motions by the housing.

The reflected beam is collimated by a double convex condensing lens 30 fixed relative to the housing working together with a plano-concave lens 32. The output beam from the lens 32 is of suitable cross-section for use in alignment work and is substantially collimated so that its cross-section is relatively constant at various distances from the source.

A plano-concave lens 32 is supported with its concave side spaced from the exit side of the condensing lens 30. The lens 32, which acts as a prism, is pivotably supported on an arm 34 about a pivot point 36. The pivot point 36 is located at the center of curvature of the concave surface of the lens and on the axis of the beam and the lens 30. Motion of the arm 34 about the pivot point 36 thus shifts the plano-concave lens 32 in such a manner as to maintain the concave surface invariant with respect to the convex exit surface of the collimating lens 30.

As will be subsequently described, as the plano-concave lens 32 is moved about its pivot center 36 it will tend to bend the collimated light beam from the direction of the central axis of the double convex lens. The position of the plano-concave lens 32 is controlled by an adjustment mechanism including a first lever 40 which is formed integrally with the arm 34 and extends at right angles thereto, generally vertically upward from the pivot point 36. The side of the arm 40 adjacent to its upper end is contacted by a point 42 projecting laterally from the lower end of a second lever arm 44 pivotably supported at its upper end on a mount 46. The weight of the plano-concave lens 32 exerted on the arm 34 tends to cause the first lever arm 40 to rotate in a clockwise direction as viewed in FIG. 1 against the contact point 42. This in turn tends to cause the second lever arm 44 to rotate in a counter-clockwise direction. This motion is resisted and the position of both lever arms is adjusted by a contact point 48 which abutts the side of the lever arm 44 and limits its rotation in the counter-clockwise direction. Additional to the weight of the plano-concave lens 32 there may be added weights or properly mounted springs, (not shown) which would act to further force lever arm 40 in the clockwise direction.

Contact point 48 is adjusted by a micrometer-like screw mechanism 50 having its outer element fixed to the housing 10. The micrometer has a shaft 52 and rotation of the shaft causes a linear motion of the contact point 48. When the contact point 48 is withdrawn the force exerted by the lever arm 40 maintains the arm 44 in contact with the point 48. Thus adjustment of the micrometer rotates the arms 44 and 40 and causes an adjustment of the position of the plano-concave lens 32 relative to the condensing lens 30.

The micrometer 52 is rotated by means of a gear 54 affixed thereto and in mesh with an adjustment pinion 54. The pinion is supported relative to the housing 10 in a journal block 56. It may be manually adjusted by a knob 58 disposed externally of the housing 10 and connected to the pinion 54 by means of a shaft 60. The pinion 54 is also in meshed engagement with a gear 62 fixed to the shaft 54 of a mechanical digital display device 66.

Accordingly a rotation of the knob causes a variation in the position of the micrometer shaft 48, and thus of the position of the plano-concave lens 32, and simultaneously causes a rotation of the shaft of the digital counter 66, changing the digital numeral displayed by the counter. This numeral is visible through a suitable window (not shown) in the side of the housing 10. It provides the user with an indication of the relative position of the plano-concave lens 32 so that the exit angle and grade of the light beam from the housing may be adjusted. The digital indicator is preferably arranged so that it reads zero when the beam exits from the planar surface of the lens 32 in the horizontal plane. If the beam reflected by the mirror 18 is stabilized in the horizontal plane this occurs when the lens 32 is arranged centrally about the axis of the condensing lens 30 and thus imparts no bend to the exiting light beam. Rotation of the knob 58 in one direction will produce a corresponding motion of the plano-concave lens 32 in a clockwise direction to elevate the angle of departure of the beam relative to the housing, while the rotation of the knob 58 in the opposite direction will lower the angle of the beam relative to the beam entering the double convex lens 30. The digital indicator 66 is bidirectional and will display a numeral representing the grade and an appropriate sign.

FIG. 2 illustrates the relative positions of the elements of the beam grade adjusting mechanism when the knob 58 has been rotated to extend the micrometer contact point 44 and provide a negative indication on the digital readout 66. The extension of the point 48 forces the lever arm 44 to rotate in a clockwise direction about its pivot point 46. The contact point 42 will slide along the surface of the first lever arm 40 causing that lever arm to rotate in a counter-clockwise direction. The angle relative to the vertical, or zero position, through which the lever arm 44 is moved has been designated A in FIG. 2. This produces a corresponding rotation B of the lever arm 40 about its pivot point 36 and causes the plano-concave lens 32 to rotate about the pivot point 36 to incline the planar surface relative to the central axis of the condensing lens 30 through an angle C which is equal to the Angle D. This inclination of the planar surface varies the angle of refraction of the exiting light beam across the cross-section of the beam to produce a bending of the beam through the angle D relative to the entrance angle of the central axis of the beam to the plano-concave lens. FIG. 3 illustrates that this deflection is in a direction opposite to the inclination of the plano-concave lens 32.

The bending of the light beam when the planar surface of the plano-concave lens 32 is inclined with respect to the entering beam's central axis occurs in accordance with the well known Snell's law of deviation of light at a surface between regions or materials of different indices of optical refraction. Snell's law defines the bend angle D as: $D = -C + \text{Arcsin}(N \sin C)$ where D is the bending of the beam produced by a tilt of the planar surface of the plano-concave lens 32 through an angle C and N equals the index of refraction of the material used in the plano-concave lens (assuming that the index of refraction of the atmosphere is equal to 1).

The purpose of the linkage consisting of the arms 40 and 44 is to cause a motion of the arm 44 through an angle having a tangent which is exactly equal to the exit light beam angle D, so that a direct measurement of the tangent of angle A will give a direct reading of the tangent of angle D, the grade setting. This relationship is produced when the ratio of the distance between the pivot points 36 and 46 to the distance between the contact point 42 and the pivot point 46 is equal to the ratio between the index of refraction of the plano-concave lens 30 and the index of refraction of the atmosphere. Accordingly, in the preferred embodiment of the invention the distances between the pivot points 36 and 46 and the distance between the contact point 42 and the pivot point 46 are chosen to be in the ratio N so that a measurement of the tangent of angle A will give a measurement of the grade (tangent) of the beam angle D.

In operation, when the housing 10 is disposed in substantially a vertical orientation the pendulously supported mirror 18 will maintain the diverging beam reflected to the condensing lens 7 in a position that is stabilized against rotation of the housing about the axis represented by the pivot point 20. Such rotation of the housing will be offset by a corresponding rotation of the mirror through an equal angle in the opposite direction. Thus all digital readings of the deviation of the beam, is displayed on the digital readout 66 will be with respect to the central axis of the beam entering the plano-concave lens 32.

When the beam is adjusted to any of its grade settings, through use of the knob 21, the pendulously supported mirror 18 will maintain this adjustment independent of small motions of the housing which tend to cause the beam to depart from that angle.

It should be recognized that in alternate embodiments of the invention the adjustment mechanism could be employed to provide a direct adjustment of the beam along another axis, other than that shown in FIG. 1, either alone or in connection with the adjustment already shown in FIG. 1.

It should also be recognized that the optical elements used to control the collimation, of the light beam can be specificied and adjusted to provide other than a collimated beam. That is, a convergent beam or a divergent beam having either a symmetrical or a non-symmetrical cross-section can be incorporated as part of the laser alignment device described herein.

In alternate embodiments the condensing lens 30 or a suitable combination of optical elements located before the plano-concave lens might be pendulously mounted and the mirror 18 maintained in a fixed position in order to achieve the automatic stabilization of the beam. Other forms of damping arrangements could similarly be employed with the invention.

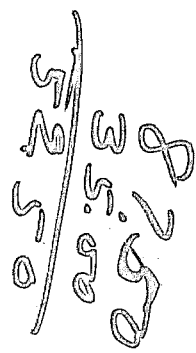

Having thus described our invention we claim:

1. A device for adjusting the angle of inclination of a light beam, comprising: a housing; a plano-concave lens pivotably supported with respect to the housing for motion about a first pivot point located at the center of curvature of its concave section; a first lever arm fixed with respect to said lens, a second lever arm pivotably supported with respect to the housing for motion about a second axis and having its free end in contact with the free end of said first arm; means for adjusting the position of said second arm so as to cause adjustment of the position of said lens about said center of curvature; an optical element supported with respect to said housing adapted to receive the beam and pass it to the plano-concave lens; and means for maintaining said optical element at a constant inclination relative to the horizontal plane for a limited movement of the housing relative to the horizontal plane.

2. The device of claim 1 wherein the ratio of the distance between the first pivot point and the second pivot point to the distance between the second pivot point and the point of contact of said first and second lever arms is equal to the ratio between the index of refraction of the lens and the index of refraction of the atmosphere so that adjustment of the position of the second lever arm through a particular angle about the second pivot point causes adjustment of the angle of inclination of the light beam through the same angle.

3. The device of claim 1 wherein the means for adjusting the position of the second lever arm consists of a member contacting said second arm and adjustable along a line normal to the line between said first and second axes so that a small change in position of said member produces a directly propotional change in the tangent of the angle of said second lever arm.

4. The device of claim 1 wherein the light beam passes through the center of rotation of the plano-concave lens.

5. The device of claim 1 including a lens disposed between said optical element and said plano-concave lens having a convex surface supported with the center of curvature of said convex surface symmetrically disposed to the center of curvature of the concave surface of said plano-concave lens so that the light beam passes through said lens having the convex surface before reaching the plano-concave lens and so that these lenses together serve to substantially collimate the beam entering the convex lens.

6. The device of claim 5 wherein said optical element consists of a mirror which reflects said light beam and said means for maintaining the said optical element at a constant inclination relative to the horizontal plane, consists of a pivotable mount for the mirror and a pendulum attached to the mirror.

7. The device of claim 6 including means for damping the motion of said mirror about its mount.

8. The device of claim 5 wherein the light beam is derived from a laser and including a diverging lens through which the laser beam is passed before reaching the lens having a convex surface.

9. The device of claim 1 including a laser supported on said housing so as to produce said light beam.

10. A device for adjusting the angle of a light beam, comprising: a housing; a plano-concave lens supported on said housing for pivotable motion about the center of curvature of its concave surface; manually adjustable means for moving said lens about the center of curvature of its concave surface; an optical element supported on a housing operative to receive said beam and pass it to the concave surface of said plano-concave lens; and means for maintaining the inclination of said optical element constant relative to the horizontal plane for a limited amount of movement of the housing relative to the horizontal plane.

11. The device of claim 10 wherein the optical element consists of a mirror which receives the light beam and reflects it to said plano-concave lens.

12. The device of claim 11 wherein the source of the beam is a laser.

13. The device of claim 12 wherein a diverging lens is disposed between the laser and the mirror.

14. The device of claim 13 wherein a converging lens is disposed between the mirror and the plano-concave lens.

15. The device of claim 14 wherein the converging lens has a convex exit surface and is supported so that the center of curvature is symmetrically disposed relative to the center of curvature of the concave surface of the plano-concave lens.

16. The device of claim 10 including a laser supported on said housing so as to produce the light beam.

* * * * *